Sept. 7, 1943.  G. J. LORANT  2,329,064
PACKAGE FOR NATURAL SAUSAGE CASINGS AND METHOD
OF CURING AND PACKING THE SAME
Filed Nov. 8, 1940
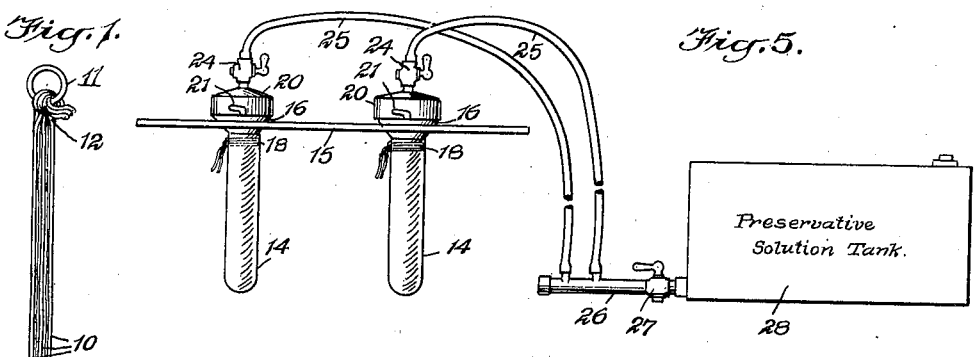
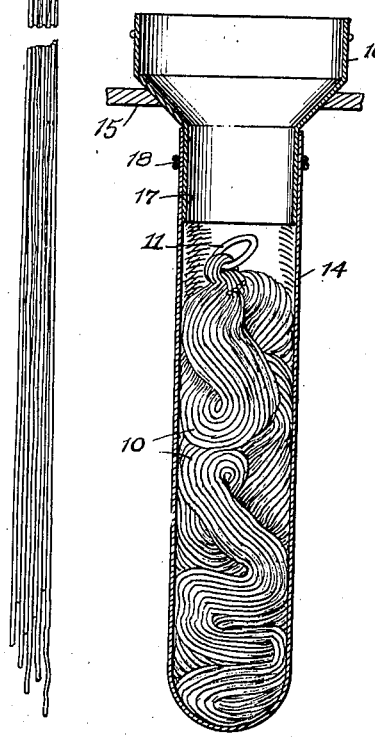
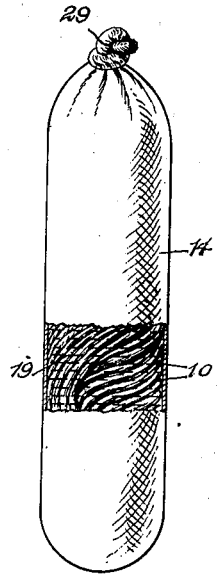
WITNESSES
Geo. W. Naylor
INVENTOR
George J. Lorant
BY
Munn, Anderson & Liddy
ATTORNEYS Patented Sept. 7, 1943

2,329,064

UNITED STATES PATENT OFFICE 2,329,064

PACKAGE FOR NATURAL SAUSAGE CASINGS AND METHOD OF CURING AND PACKING THE SAME

George J. Lorant, New York, N. Y., assignor to Mongolia Importing Co., Inc., New York, N. Y.

Application November 8, 1940, Serial No. 364,788

3 Claims. (Cl. 99—175)

This invention relates to a new method of curing and packing natural sausage casings and also to an improved natural sausage casing package.

Natural sausage casings are generally made from the intestines of lambs, sheep, goats and hogs. The method which has been customarily used for many years in the casing industry for curing, preserving and packing natural sausage casings has many disadvantages. Thus it involves a wasteful application of common salt as a curing agent, necessitates excessive amount of labor both by the packer and user, and results in a great deal of wastage of the casings by the packer and user.

It is a prime object of the present invention to overcome these difficulties and to provide an improved method and package for natural sausage casings which eliminates or minimizes the wasting of salt or other preservatives, reduces the amount of labor required both by the packer and user, and avoids wastage of the casings themselves.

In the packing of natural sausage casings, the casings are first cleaned, sorted according to size or diameter, and are measured into uniform units say of approximately one hundred yards apiece. In the method heretofore commonly employed, the casings were then slushed in dry or semi-dry common salt. Thereafter the slushed salt casings were placed on racks for drainage. After the drainage was completed, the casings were placed on a salt covered bench and wound into a hank on a wheel. Each hank was knotted or tied together and the hanks were then placed in tight tierces with additional salt for storage and subsequent shipment to the trade. This method consumed a considerable amount of salt for the preservation of the casings (i. e. on an average of approximately a pound per hank). Of this amount only approximately 15 per cent adhered to the casings, the remainder of the salt passing down the drain pipes and being wasted. Also considerable time and labor was required for the several operations. Heavy casks were also required for storage, and duplication of labor resulted from the necessity of recounting and repacking for shipment to the consumer or customer. In addition the old method did not insure complete and uniform salt penetration and very often caused partial or total depreciation of the gut tissue's original tensile strength. Due to the evaporation of the moisture in the packed casings and the resulting dryness, the salt crystals ate through the gut tissue which in turn reduced the usefulness and value of the casings. Also at times hard rust formed on the casings making them unfit for use.

When the customers, i. e. sausage manufacturers, purchased the casings it was necessary to wash off the salt, carefully and painstakingly unwind the hank, and soak it in water until it became pliable and soft. It will also be appreciated that both in the formation and in the unwinding of the hanks knots or tangles frequently formed in the casings which resulted either in the wasting of considerable time and labor in unraveling of the knots and tangles, or in the wastage of the knotted and tangled portions.

These disadvantages and difficulties have long been recognized in the sausage casing industry, but prior to the present invention no one has been able to overcome them. The present invention overcomes these difficulties by means of the method and package hereinafter described. The various types of tissue deterioration, referred to above, that may inflict natural sausage casings either before or during their period of preservation and also during the time that they are stored are known in the trade as salt burn. The deterioration may be caused directly by salt crystals and their impurities or by bacterial action. It is a further object of this invention to provide an improved package, process and preservative which will substantially eliminate salt burn deterioration of the casings.

In the accompany drawing:

Fig. 1 is a partially fragmentary view of natural sausage casings prepared in accordance with my present invention for insertion in the envelope or container;

Fig. 2 is a longitudinal sectional view showing an envelope or container applied to a funnel and with the casings inserted therein;

Fig. 3 is a view similar to Fig. 2 showing the liquid preservative in the envelope and also showing an attachment which may be used in injecting the preservative;

Fig. 4 is a view of the completed package with a portion of the envelope broken away so as to reveal the contents thereof; and Fig. 5 is a partially fragmentary view of one type of apparatus that may be used in connection with my method.

In carrying out my method, the natural sausage casings are first cleaned in the usual manner, assorted or graded according to size or diameter, and then measured into units of uniform length, the present commercial units being 100 yards. To produce a unit of this length, it is naturally necessary to employ a plurality of separate strands of casings. I arranged the strands in each unit in generally parellel relationship as indicated at 10 in Fig. 1. The strands are usually of varying length and in arranging the strands I position one end of each of the strands in proximate relationship permitting the other ends of the strands to depend downwardly in irregular fashion.

So as to preserve the casings in an orderly arrangement and so as to simplify the task of locating one end of each of the strands, I prefer to extend the proximately positioned ends of the strands through a ring 11 which may be made of suitable material such as Bakelite, pyroxylin or cellulose acetate. The ends of the casing which have been extended through the ring 11 are then formed into a slip knot as indicated at 12. When the casings are arranged in this fashion there is generally sufficient friction and tension to permit the casings to be lifted by means of the ring 11. However if sufficient pulling force is exerted upon the ring 11 and upon the depending ends of the casings, the slip knot will give and release the casing from the ring without any damage or injury to the casings.

Either before or after the casings are attached to the ring they are saturated with a substantially saturated solution of common salt (i. e. sodium chloride) so as to prevent dilution of the salt solution which is used in my improved package as a preservative. As will be more fully explained, I prefer to employ a saturated salt solution which is moderately acid in reaction having a pH value of approximately between 5 and 6.

After the casings have been prepared in this fashion, I then insert them in a suitable waterproof envelope or container. For this purpose, I prefer to employ a generally tubular envelope made of flexible water-proof material as indicated at 14. And for this purpose, I have found that a casing made of rubber, a rubber compound, or latex is very satisfactory.

To facilitate the inserttion of the casings in the envelope, a rack 15 may be employed having a plurality of funnels 16 mounted thereon in substantially vertical or upright position. The restricted lower end of each funnel indicated at 17 is of a size or diameter to permit the upper end of envelope 14 to be disposed therearound. The envelopes are placed around the lower end of the funnel in the manner shown and are held in position against accidental release by the tension of the rubber, although, if desired, suitable means such as strands of cord 18 tied therearound by means of a slip knot may be employed for this purpose.

When the envelopes have been applied to the funnels in the manner indicated, it will be appreciated that it is a simple matter to insert the casings through the funnels into the envelopes. In this connection the free depending ends of the casing should be inserted into the envelope first so that the ring 11 remains at the top as indicated in Figs. 2 and 3 so as to serve as a handle to facilitate the removal of the casings from the package when it is desired to use them. After the casings have been inserted, a liquid preservative is then injected into the envelope so as to substantially cover the casings as indicated at 19.

The liquid preservative preferably takes the form of a substantially saturated aqueous solution of sodium chloride as this serves not only as a preservative but also as a dehydrating agent to prevent tenderizing action on the casings. In this connection I have found that salt burn or rust generally occurs where a neutral or slightly alkaline condition exists. I have also found that when the salt penetration is better and more universal salt burn or rust is less likely to occur. By preserving the casings in a saturated solution of salt a more complete and universal penetration is assured and the casings may be preserved almost indefinitely with a high degree of safety and a minimum of deterioration. Furthermore I have found that by using a saturated brine which is moderately acid in reaction the safety factor is greatly enhanced and salt burn or rust deterioration is substantially eliminated. In this connection, I prefer to employ a saturated solution of sodium chloride having a pH value of between approximately 5 and 6. The acid reaction may be imparted to the solution by adding thereto many different types of acids or acid salts such as acetic acid, hydrochloric acid, or lactic acid. Sufficient acid or acid salt should be added to the saturated brine so as to give it a pH value of between approximately 5 and 6. If a dilute brine is employed I have found that the acid causes a swelling of the tissue but by employing a substantially saturated brine the swelling is avoided.

The preservative may be inserted in any desired manner. However I have found that it can be inserted conveniently and expeditiously by means of the apparatus shown in Figs. 3 and 5. This apparatus comprises a hood 20 for each of the funnels which is of a size and shape to fit over the top of the funnel and tightly engage the same. The funnel and hood may be provided with an interengaging rib and groove as indicated at 21 and a washer 22 is preferably positioned in the hood so as to engage the upper edge of the funnel. The central portion of the hood is preferably provided with a tubular nipple 23 which is connected with a valve 24 which in turn connects with a flexible hose 25. As previously stated, a hood is formed for each of the funnels and the hoses 25 form the several hoods may connect to a unitary manifold 26 which communicates through valve 27 with a tank 28 containing the liquid preservative. The preservative may be fed from the tank by gravity or as shown in the drawing by means of pressure, the tank 28 shown in the accompanying drawing being placed under pressure so as to force the liquid preservative to the several hoods.

The flow of the liquid is controlled by means of the master valve 27 and also by means of the individual valves 24 which are provided for each of the hoods. When the device is in operation the master valve 27 may be left open and the flow of the preservative is controlled separately by the valves 24.

When sufficient preservative has been inserted in the envelope to cover the casings as shown in Fig. 3, the envelope is removed from the lower end of funnel 16 and the upper end thereof is then sealed in a suitable manner so as to prevent evaporation of the liquid from the interior of the envelope. When a rubber or latex envelope is employed I have found that a satisfactory seal is obtained by forming the open end of the envelope into a tight knot as indicated at 29. When the envelope has been sealed in this fashion my package and method are completed and the package may be stored for a relatively long time or may be shipped directly to the customer.

When the package is used by the customer (i. e. a sausage manufacturer) the top of the envelope is opened either by untying the knot 29, which is a simple matter, or by cutting the knot off. The casings can be readily removed from the envelope in orderly fashion by merely grasping the ring 11 and withdrawing it from the envelope. The casings when withdrawn are arranged in substantially parallel relationship and are free from knots and tangles. The ring can be conveniently removed from the ends of the casings in the manner previously described namely, by pulling the ring with reference to the casings until the slip knot releases. The casings are then immediately ready for use without any further treatment or washing.

From the foregoing description of my invention, it will be apparent that my method and packing results in considerable saving of time and labor due to the elimination of many of the steps heretofore used such as the formation of the hank which necessarily required the unwinding of the hank. It also results in elimination of wastage of the casings which formerly resulted from the knotting and tangling of the casings and from the salt burn, hard rust and drying out of the casings. Economy in the use of salt or other preservatives also results from my method and package due to the fact that substantially all of the preservative is used and does not drain off as in the former method. The costly and repetitious handling of the treated casings required by the former method and also the heavy wooden tierces formerly employed are also eliminated. It will also be seen that my method and package produces a sterile hygienic product of undiminished tensile strength due to the uniform and complete penetration of the preservative into the casings and the type of preservative employed and described.

It should, of course, be appreciated that while I have shown and described one illustrative embodiment of my invention, many modifications may be made therein without departing from the scope of the invention as set forth in the accompanying claims. Thus I have described the preservative as being inserted in the envelope after the casings but it should be appreciated that it may be inserted prior to or simultaneously with the casings.

I claim:

1. A package of natural sausage casings comprising an envelope made of flexible water-proof material and comprising an elongated member permanently closed at one end and provided with a seal at the opposite end to prevent the evaporation of moisture, a plurality of natural sausage casings disposed in the envelope, means forming a handle releasably connected to one end of each of the casings by means of a slip knot, and a liquid preservative disposed in the envelope and substantially covering the casings said liquid preservative comprising a substantially saturated solution of sodium chloride containing therein an acid medium which imparts to the solution a pH value of approximately between five and six.

2. A package of natural sausage casings comprising an envelope, a natural sausage casing disposed therein and a liquid preservative consisting of a substantially saturated solution of sodium chloride disposed in the envelope and covering the casing said solution containing an acid medium imparting a moderately acid reaction thereto.

3. The method of curing and packing natural sausage casings which comprises first cleaning and grading the casings and then placing them in a liquid preservative consisting of a sodium chloride solution which is moderately acid in reaction.

GEORGE J. LORANT.